US011794581B2

(12) United States Patent
Sakurai et al.

(10) Patent No.: US 11,794,581 B2
(45) Date of Patent: Oct. 24, 2023

(54) VEHICLE DISPLAY CONTROL DEVICE, ACCELERATION DISPLAY METHOD, AND NON-TRANSITORY MEMORY MEDIUM MEMORIZING PROGRAM

(71) Applicant: TOYOTA JIDOSHA KABUSHIKI KAISHA, Aichi-ken (JP)

(72) Inventors: Hideyuki Sakurai, Toyota (JP); Yoshimi Kobayashi, Toyota (JP); Kazuhisa Maeda, Toyota (JP); Nobuhiro Nakano, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 62 days.

(21) Appl. No.: 17/519,513

(22) Filed: Nov. 4, 2021

(65) Prior Publication Data

US 2022/0144086 A1 May 12, 2022

(30) Foreign Application Priority Data

Nov. 10, 2020 (JP) .................................. 2020-187483

(51) Int. Cl.
*B60K 35/00* (2006.01)
*G06F 3/14* (2006.01)

(52) U.S. Cl.
CPC ............... *B60K 35/00* (2013.01); *G06F 3/14* (2013.01); *B60K 2370/167* (2019.05); *B60K 2370/172* (2019.05); *B60K 2370/349* (2019.05); *B60K 2370/52* (2019.05); *B60K 2370/73* (2019.05); *B60K 2370/771* (2019.05); *B60K 2370/785* (2019.05); *B60K 2370/788* (2019.05); *B60K 2370/794* (2019.05)

(58) Field of Classification Search
None
See application file for complete search history.

(56) References Cited

U.S. PATENT DOCUMENTS 4,484,192 A * 11/1984 Seitz ...................... G09G 5/346
715/764
5,123,497 A * 6/1992 Yopp ................... B60G 17/0162
701/1
6,438,463 B1 * 8/2002 Tobaru ................. B60G 17/018
701/1

(Continued)

FOREIGN PATENT DOCUMENTS

JP 2009298201 A 12/2009
JP 2013249026 A 12/2013

(Continued)

*Primary Examiner* — Jason A Pringle-Parker
(74) *Attorney, Agent, or Firm* — HAUPTMAN HAM, LLP

(57) ABSTRACT

A vehicle display control device includes: an acceleration prediction section that predicts a direction of an acceleration acting on a vehicle based on information including at least one of: information regarding a planned travel path of the vehicle, information acquired from a periphery information detection sensor that detects information regarding a vehicle periphery, or information acquired from an acceleration sensor that detects an acceleration of the vehicle; and a display control section that, in a case in which an acceleration predicted by the acceleration prediction section is greater than a predetermined threshold, displays a direction of the predicted acceleration at a display portion in a vehicle cabin.

14 Claims, 10 Drawing Sheets

(56) References Cited

U.S. PATENT DOCUMENTS

| | | | |
|---|---|---|---|
| 7,918,781 B1* | 4/2011 | Smyth | A61M 21/00 |
| | | | 600/27 |
| 9,457,914 B1* | 10/2016 | Cline | B64D 45/00 |
| 9,696,177 B2 | 7/2017 | Sasaki | |
| 2013/0006478 A1* | 1/2013 | Lin | B60N 2/10 |
| | | | 701/49 |
| 2013/0325279 A1 | 12/2013 | Fujimoto et al. | |
| 2014/0152697 A1* | 6/2014 | Shin | G06T 7/73 |
| | | | 345/633 |
| 2017/0113641 A1* | 4/2017 | Thieberger | B60R 21/04 |
| 2017/0136842 A1* | 5/2017 | Anderson | A61B 5/4023 |
| 2017/0151906 A1* | 6/2017 | Sakuma | G05D 1/0088 |
| 2017/0253252 A1* | 9/2017 | Donnelly | G02B 27/017 |
| 2017/0253254 A1* | 9/2017 | Sweeney | G05D 1/02 |
| 2017/0274931 A1* | 9/2017 | Yang | B60K 35/00 |
| 2020/0234347 A1* | 7/2020 | Hwang | B60K 35/00 |
| 2021/0114553 A1* | 4/2021 | Awtar | B60N 2/39 |
| 2022/0004348 A1 | 1/2022 | Utsunomiya et al. | |
| 2022/0144086 A1* | 5/2022 | Sakurai | B60K 35/00 |

FOREIGN PATENT DOCUMENTS

| | | |
|---|---|---|
| JP | 2017171117 A | 9/2017 |
| JP | 2018069753 A | 5/2018 |
| JP | 2019137179 A | 8/2019 |
| JP | 2019172070 A | 10/2019 |
| WO | 2015145674 A1 | 10/2015 |
| WO | 2019155824 A1 | 8/2019 |
| WO | 2019189515 A1 | 10/2019 |
| WO | 2020189238 A1 | 9/2020 |

\* cited by examiner

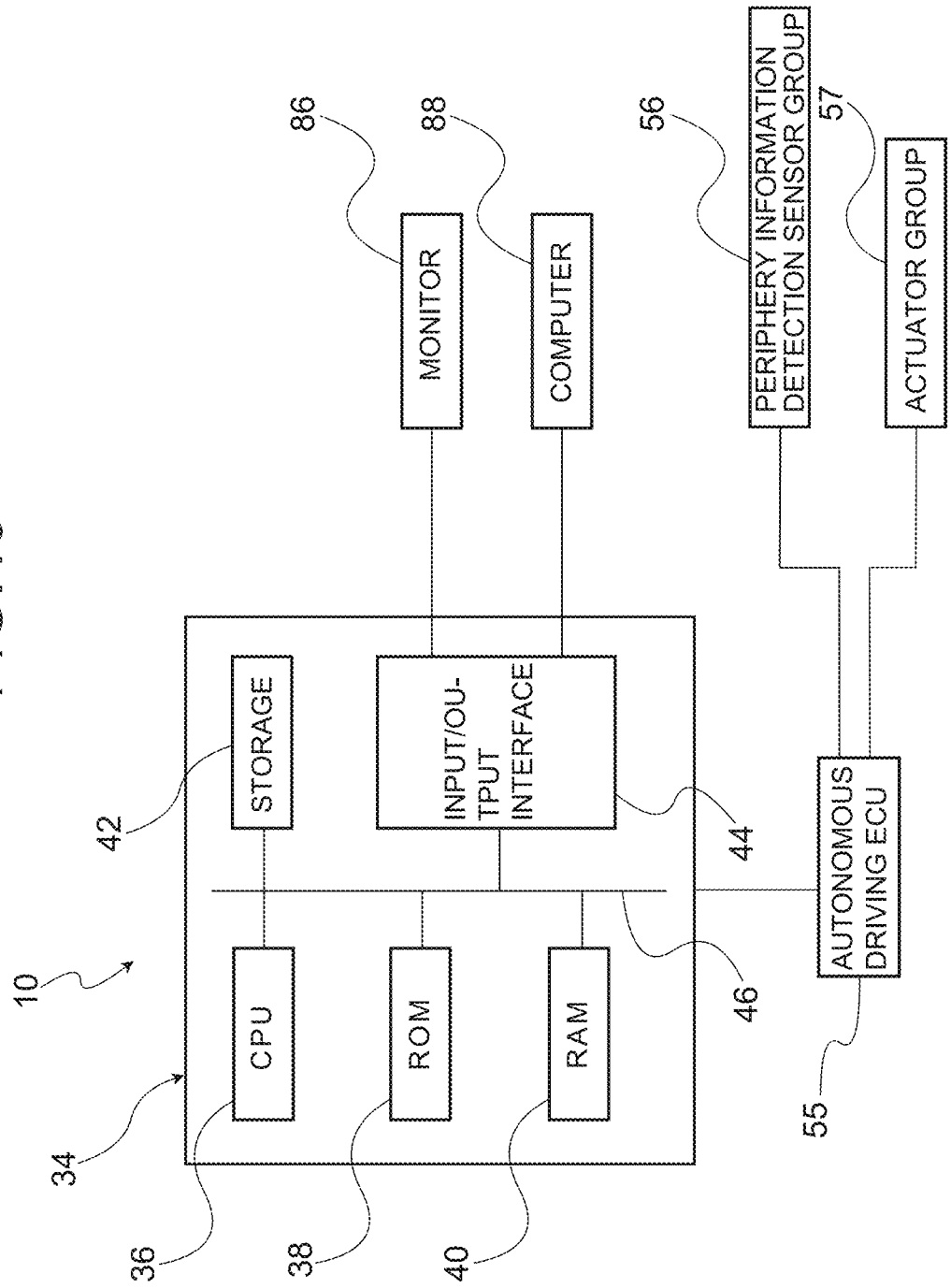

VEHICLE DISPLAY CONTROL DEVICE, ACCELERATION DISPLAY METHOD, AND NON-TRANSITORY MEMORY MEDIUM MEMORIZING PROGRAM

CROSS-REFERENCE TO RELATED APPLICATION

This application is based on and claims priority under 35 USC 119 from Japanese Patent Application No. 2020-187483 filed on Nov. 10, 2020, the disclosure of which is incorporated by reference herein.

BACKGROUND

Technical Field

The present disclosure relates to a display control device for a vehicle, an acceleration display method, and a non-transitory memory medium memorizing a program.

Related Art

Japanese Patent Application Laid-Open (JP-A) No. 2017-171117 discloses an in-cabin indicator display device that matches the directions of indicators provided at both left and right end portions of an instrument panel with a direction of optical flow of a driver. In JP-A No. 2017-171117, because the directions of the indicators are altered in accordance with the direction of the sightline of the driver, a direction of progress of the vehicle is easier to understand even during night driving with reduced spatial awareness. International Patent Publication No. 2015/145674 discloses a vehicle movement communication device that computes vehicle movements during autonomous driving control and illuminates light sources disposed at a steering wheel with illumination patterns according to the computed vehicle movements.

However, in the inventions disclosed in JP-A No. 2017-171117 and International Patent Publication No. 2015/145674, a vehicle occupant must pay attention to a vicinity of a driver seat of the vehicle to intuitively understand movements of the vehicle; there is scope for improvement.

SUMMARY

The present disclosure provides a vehicle display control device, an acceleration display method, and a non-transitory memory medium memorizing a program that may enable intuitive understanding of movements of a vehicle without attention being paid to a vicinity of a driver seat.

A first aspect of the present disclosure is a vehicle display control device including: an acceleration prediction section that predicts a direction of an acceleration acting on a vehicle based on information including at least one of: information regarding a planned travel path of the vehicle, information acquired from a periphery information detection sensor that detects information regarding a vehicle periphery, or information acquired from an acceleration sensor that detects an acceleration of the vehicle; and a display control section that, in a case in which an acceleration predicted by the acceleration prediction section is greater than a predetermined threshold, displays a direction of the predicted acceleration at a display portion in a vehicle cabin.

In the vehicle display control device according to the first aspect, the acceleration prediction section predicts directions of accelerations acting on the vehicle. The prediction of a direction of acceleration is based on information including one or more of information regarding a planned travel path of the vehicle, information acquired from periphery information detection sensors that detect periphery information of the vehicle, and information acquired from the acceleration sensor that detects accelerations of the vehicle. In a case in which an acceleration predicted by the acceleration prediction section is greater than the predetermined threshold, the display control section displays the direction of the predicted acceleration at a display portion in the vehicle cabin. Therefore, a vehicle occupant may intuitively understand the direction in which an acceleration is to act on the vehicle before the acceleration acts.

When a direction of acceleration is displayed at various display portions in the vehicle cabin, the vehicle occupant may recognize the direction of acceleration displayed at the display portions without mental effort, and may intuitively understand the direction in which the acceleration is to act without paying attention to a vicinity of the driver seat. The meaning of "a direction of acceleration is displayed at display portions in the vehicle cabin" as used herein is not intended to be limited to configurations that directly display the direction in which an acceleration is to act by text, an arrow or the like but to broadly encompass configurations that indirectly display the direction in which an acceleration is to act by a flow of color and pattern or the like.

A second aspect of the present disclosure, in the first aspect, the display control section may display the direction of the predicted acceleration at at least one of interior trim members including a pillar garnish, a door trim, an instrument panel, a roof headlining and a flooring material.

In the vehicle display control device according to the second aspect, the direction of a predicted acceleration is displayed at one or more interior trim members. Therefore, the vehicle occupant may intuitively understand the direction in which the acceleration is to act even when facing to a side region side, lower side or the like of the vehicle cabin.

A third aspect of the present disclosure, in the first aspect, the display portion at which the display control section displays the direction of the predicted acceleration is at least one of a windshield glass or a side glass.

In the vehicle display control device according to the third aspect, the direction of a predicted acceleration is displayed at one or more of the windshield glass and side glasses. Therefore, the vehicle occupant may intuitively understand the direction in which the acceleration is to act even when their sightline is directed outside the vehicle.

A fourth aspect of the present disclosure, in any one of the first to third aspects, the display control section displays the direction of the predicted acceleration at at least one of image display portions selected from a group consisting of a monitor provided in the vehicle cabin and a portable terminal.

In the vehicle display control device according to the fourth aspect, the vehicle occupant may intuitively understand the direction in which an acceleration is to act even in a situation in which the vehicle occupant is looking at the monitor provided in the vehicle cabin, a portable terminal or the like.

A fifth aspect of the present disclosure, in any one of the first to fourth aspects, the display control section may display the direction of the predicted acceleration by displaying a flow of light.

In the vehicle display control device according to the fifth aspect, because the direction in which an acceleration is to act is illustrated by a direction of flow of light, the vehicle occupant may understand the direction in which the acceleration is to act more intuitively than when the direction is displayed by text or the like.

A sixth aspect of the present disclosure, in the fifth aspect, the display control section may alter at least one of a color, a brightness or a flow speed of the light in accordance with a magnitude of the predicted acceleration.

In the vehicle display control device according to the sixth aspect, as well as the direction in which an acceleration is to act, a magnitude of the acceleration may be intuitively understood.

A seventh aspect of the present disclosure, in any one of the first to fourth aspects, the display control section displays the direction of the predicted acceleration by displaying text or an arrow.

In the vehicle display control device according to the seventh aspect, because the direction in which an acceleration is to act is directly displayed by text or an arrow, the vehicle occupant may be less likely to misrecognize the direction.

An eighth aspect of the present disclosure, in the seventh aspect, the display control section may alter at least one of a color, a brightness or a size of the text or arrow in accordance with a magnitude of the predicted acceleration.

In the vehicle display control device according to the eighth aspect, as well as the direction in which an acceleration is to act, a magnitude of the acceleration may be intuitively understood.

A ninth aspect of the present disclosure, in any one of the first to eighth aspects, in a case in which accelerations greater than the predetermined threshold are predicted to act in a plurality of directions by the acceleration prediction section, the display control section may display a direction in which a largest of the accelerations is to act.

In the vehicle display control device according to the ninth aspect, because only the direction in which the largest acceleration is to act is displayed, the vehicle occupant may be less likely to be confused than in a case in which plural directions of acceleration are displayed.

A tenth aspect of the present disclosure, in any one of the first to eighth aspects, in a case in which accelerations greater than the predetermined threshold are predicted to act in a plurality of directions by the acceleration prediction section, the display control section may display an acceleration acting in a vehicle front-and-rear direction with priority.

In the vehicle display control device according to the tenth aspect, because accelerations acting in the front-and-rear direction are displayed with priority, the vehicle occupant may prepare for inertial forces that act on the vehicle occupant in the vehicle front-and-rear direction, particularly at times of rapid braking of the vehicle, times of rapid acceleration and the like.

In a vehicle display control device according to an eleventh aspect, in any one of the first to eighth aspects, in a case in which accelerations greater than the predetermined threshold are predicted to act in a plurality of directions by the acceleration prediction section, the display control section may display an acceleration acting in a vehicle left-and-right direction with priority.

In the vehicle display control device according to the eleventh aspect, because accelerations acting in the left-and-right direction are displayed with priority, the vehicle occupant may prepare for inertial forces that act on the vehicle occupant in the vehicle left-and-right direction, particularly before turns.

A twelfth aspect of the present disclosure, any one of the first to eleventh aspects, may further include: a sightline direction acquisition section that acquires a direction in which a vehicle occupant is facing by acquiring one of a sightline direction of the vehicle occupant or an orientation of a vehicle seat, and the display control section displays the direction of the acceleration in a sightline of the vehicle occupant acquired by the sightline direction acquisition section.

In the vehicle display control device according to the twelfth aspect, because the direction of an acceleration is displayed in the sightline of the vehicle occupant, the vehicle occupant may intuitively understand the direction in which the acceleration is to act relative to the vehicle occupant, regardless of which way the vehicle occupant is facing. Moreover, annoyance may be alleviated compared to a configuration that displays directions of accelerations over large areas of the vehicle cabin interior.

A thirteenth aspect of the present disclosure, in any one of the first to twelfth aspects, the display control section: displays directions of predicted accelerations in a case in which a driving mode of the vehicle is an autonomous driving mode; and suspends the display of directions of predicted accelerations in a case in which the driving mode is a manual driving mode.

In the vehicle display control device according to the thirteenth aspect, in a manual driving mode in which a vehicle occupant is driving, the display of directions of acceleration is suspended. Therefore, the vehicle occupant may concentrate on driving. Because directions of acceleration are displayed when in the autonomous driving mode, the vehicle occupant may intuitively understand the directions in which accelerations are to act even when the vehicle occupant is not driving.

A fourteenth aspect of the present disclosure is a vehicle display control method including: predicting a direction of an acceleration acting on a vehicle based on information including at least one of: information regarding a planned travel path of the vehicle, information acquired from a periphery information detection sensor that detects information regarding a vehicle periphery, or information acquired from an acceleration sensor that detects an acceleration of the vehicle; and in a case in which a predicted acceleration is greater than a predetermined threshold, displaying a direction of the predicted acceleration at a display portion in a vehicle cabin.

A fifteenth aspect of the present disclosure is a non-transitory memory medium memorizes a program executable by a computer to execute processing including: predicting a direction of an acceleration acting on a vehicle based on information including at least one of: information regarding a planned travel path of the vehicle, information acquired from a periphery information detection sensor that detects information regarding a vehicle periphery, or information acquired from an acceleration sensor that detects an acceleration of the vehicle; and in a case in which a predicted acceleration is greater than a predetermined threshold, displaying a direction of the predicted acceleration at a display portion in a vehicle cabin.

A sixteenth aspect of the present disclosure is a vehicle display control device includes: a direction of motion prediction section that predicts a direction of motion of a vehicle based on information including at least one of: information regarding a planned travel path of the vehicle, or information acquired from a periphery information detection sensor that detects information regarding a vehicle periphery; and a display control section that displays a direction of motion predicted by the direction of motion prediction section at an interior trim member in a vehicle cabin.

In the vehicle display control device according to the sixteenth aspect, the direction of motion prediction section predicts directions of motion of the vehicle. The prediction of a direction of motion is based on information including one or more of information regarding a planned travel path of the vehicle and information acquired from periphery information detection sensors that detect periphery information of the vehicle. The display control section displays the direction of a motion predicted by the direction of motion prediction section at an interior trim member in the vehicle cabin. Therefore, without paying attention to a vicinity of the driver seat, a vehicle occupant may intuitively understand movements of the vehicle by seeing directions of motion displayed at interior trim members.

The vehicle display control device, acceleration display method, and non-transitory memory medium memorizing a program of the present disclosure may intuitively understand movements of a vehicle without paying attention to a vicinity of a driver seat.

BRIEF DESCRIPTION OF THE DRAWINGS

Exemplary embodiments of the present disclosure will be described in detail based on the following figures, wherein:

FIG. 10 is a block diagram illustrating hardware structures of the vehicle display control device according to the third exemplary embodiment.

DETAILED DESCRIPTION

First Exemplary Embodiment

Figure 1:
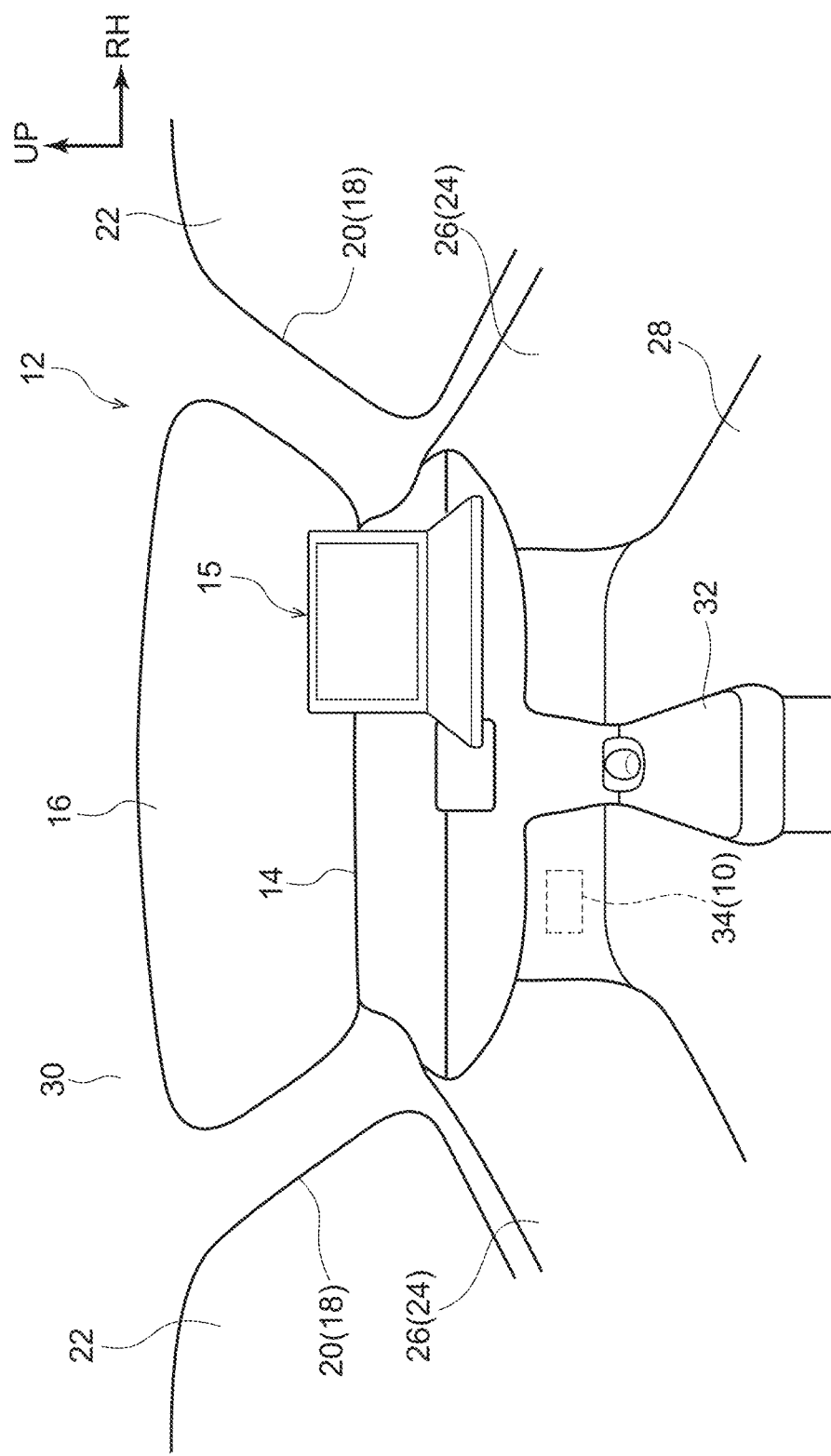
FIG. 1 is a schematic view of a front region of a cabin of a vehicle in which a vehicle display control device according to a first exemplary embodiment is employed, viewed from the vehicle rear side.

A vehicle display control device 10 according to a first exemplary embodiment is described with reference to the drawings. An arrow UP and an arrow RH that are illustrated where appropriate in the drawings represent, respectively, an upper direction of a vehicle and the right side in a width direction. Below, where descriptions are given simply using the directions front, rear, upper, lower, left and right, unless otherwise specified, these represent the front and rear in the front-and-rear direction of the vehicle in which the display control device 10 is employed, upper and lower in the vertical direction, and left and right in the width direction.

As illustrated in FIG. 1, an instrument panel 14, which serves as an example of an interior trim member, is provided at a cabin front region of a vehicle 12 in which the vehicle display control device 10 according to the present exemplary embodiment (below referred to simply as "the display control device 10") is employed.

The instrument panel 14 extends in the vehicle width direction. A computer 15 is disposed on the instrument panel 14. The computer 15 may be non-removably installed in the vehicle 12. Alternatively, the computer 15 may be brought in from outside the vehicle 12.

A lower end portion of a windshield glass 16 is supported at a front end portion of the instrument panel 14. The windshield glass 16 extends in the vehicle vertical direction and the vehicle width direction, dividing the vehicle cabin interior from the vehicle cabin exterior.

Both of vehicle width direction end portions of the windshield glass 16 are supported by front pillars 18. The front pillars 18 are covered from the vehicle cabin inner sides thereof by front pillar garnishes 20, which serve as examples of interior trim members.

Side glasses 22 are provided at the vehicle rear sides of the pair of left and right front pillars 18. Front side doors 24 are provided below the side glasses 22. The side glasses 22 are structured to be stowable in the front side doors 24. The front side doors 24 are covered from the vehicle cabin inner sides thereof by door trims 26, which serve as examples of interior trim members.

A flooring material 28 that serves as an example of an interior trim member is disposed at a floor portion of the vehicle cabin. A floor panel, which is not illustrated in the drawings, is covered from the vehicle cabin inner side thereof by the flooring material 28. The flooring material 28 is not limited to sheet-form interior trim members such as a floor carpet, a floor mat and the like but may be a structure blanketed with a plate-form member and may be structured of, for example, a material with high optical reflectivity.

A roof headlining 30, which serves as an example of an interior trim member, is provided at a ceiling portion of the vehicle cabin. The roof headlining 30 is provided in the whole area of the ceiling portion of the vehicle cabin interior. The roof headlining 30 covers a roof panel, which is not illustrated in the drawings, from the vehicle cabin inner side thereof.

A driver seat and a front passenger seat, which are not illustrated in the drawings, are provided in a cabin front region. The driver seat is provided at one side in the vehicle width direction and the front passenger seat is provided at the other side in the vehicle width direction. As an example in the present exemplary embodiment, the driver seat is at the vehicle right side and a steering wheel, which is not illustrated in the drawings, is disposed at the vehicle front side of the computer 15. A center console 32 is provided between the driver seat and the front passenger seat.

An electronic control unit (ECU) 34 constituting the display control device 10 is provided at the vehicle front side of the instrument panel 14.

—Hardware Structures of the Display Control Device 10—

Figure 4:
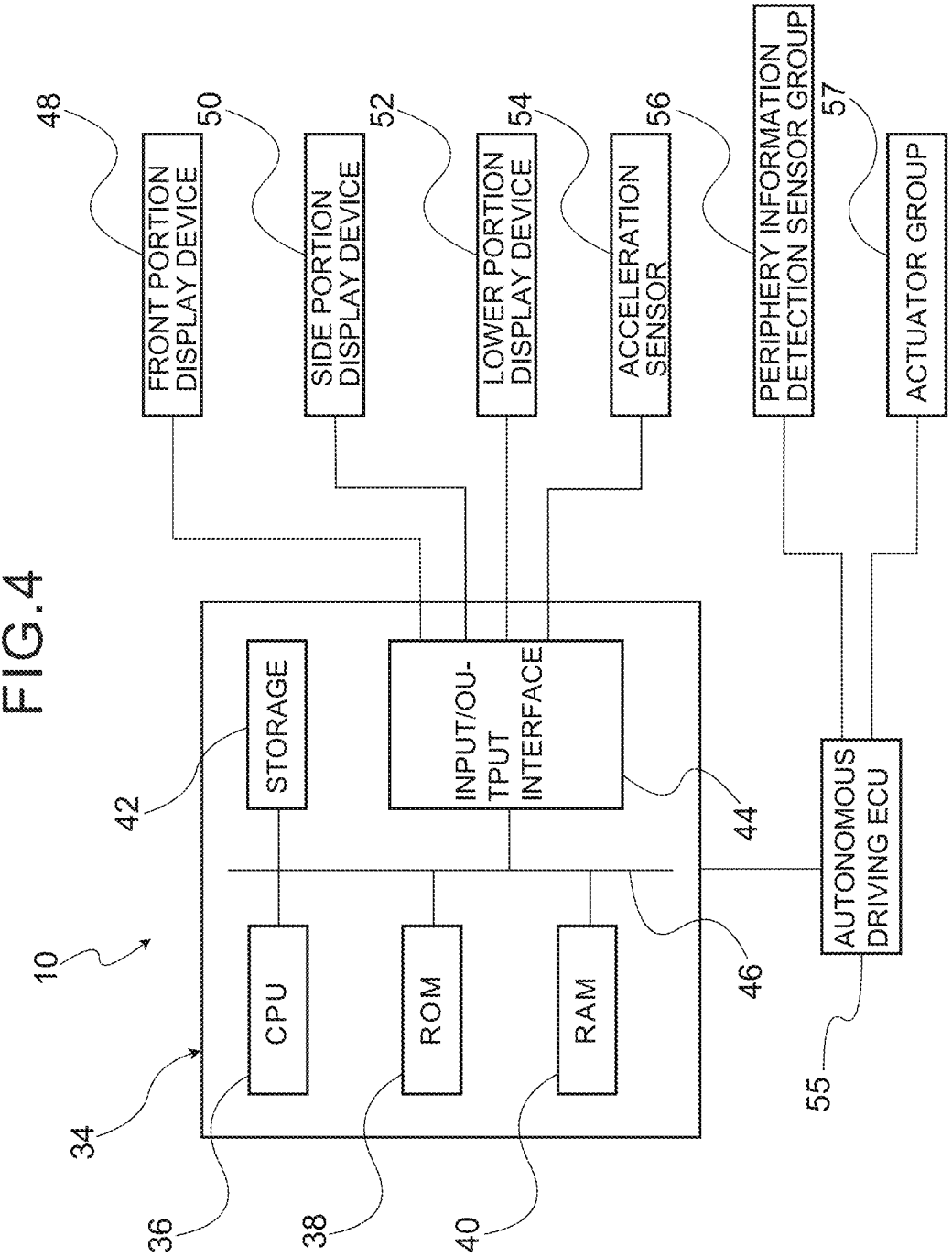
FIG. 4 is a block diagram illustrating hardware structures of the vehicle display control device according to the first exemplary embodiment.

FIG. 4 is a block diagram illustrating hardware structures of the display control device 10. As illustrated in FIG. 4, the ECU 34 of the display control device 10 includes a central processing unit (CPU, or processor) 36, read-only memory (ROM) 38, random access memory (RAM) 40, storage 42 and an input/output interface 44. These structures are connected to be capable of communicating with one another via a bus 46.

The CPU 36 is a central arithmetic processing unit that executes various programs and controls respective parts. That is, the CPU 36 reads a program from the ROM 38 or the storage 42, and executes the program using the RAM 40 as a workspace. The CPU 36 performs control of the structures described above and various kinds of computational processing in accordance with programs recorded in the ROM 38 or the storage 42.

The ROM 38 stores various programs and various kinds of data. The RAM 40 serves as a workspace, temporarily memorizing programs and data. The storage 42 is a non-transitory memory medium structured by a hard disk drive (HDD) or solid state drive (SSD). The storage 42 memorizes various programs, including an operating system, and various kinds of data. In the present exemplary embodiment, the ROM 38 or the storage 42 stores a program for implementing display processing, and various kinds of data and the like.

The input/output interface 44 is electronically connected with a front region display device 48, a side region display device 50, a lower region display device 52 and an acceleration sensor 54.

The front portion display device 48 is a display device that implements predetermined displays at interior trim members of the vehicle cabin front region. For example, the front portion display device 48 implements predetermined displays at one or more of interior trim members such as the instrument panel 14, the front pillar garnishes 20, a front portion of the roof headlining 30 and so forth by illuminating light into the vehicle front portion. Details of displays displayed at the interior trim members by the front portion display device 48 are described below.

The side portion display device 50 is a display device that implements predetermined displays at interior trim members of cabin side regions. The side portion display device 50 includes, for example, plural light sources provided inside the left and right door trims 26. The side portion display device 50 implements predetermined displays at the door trims 26 by causing the plural light sources to emit light in predetermined patterns. Details of displays displayed at the interior trim members by the side portion display device 50 are described below.

The lower portion display device 52 is a display device that implements predetermined displays at interior trim members of a cabin lower region. The lower portion display device 52 implements predetermined displays at the flooring material 28 by, for example, illuminating light at the flooring material 28. Details of displays displayed at the flooring material 28 by the lower portion display device 52 are described below.

The acceleration sensor 54 is a sensor that detects accelerations acting on the vehicle 12. The acceleration sensor 54 according to the present exemplary embodiment is structured to be capable of, for example, detecting accelerations in six axes: front-rear, left-right, upper-lower, roll, pitch and yaw.

The ECU 34 is electronically connected to an autonomous driving ECU 55. Similarly to the ECU 34, the autonomous driving ECU 55 includes a CPU, ROM, RAM, storage and an input/output interface, which are not illustrated in the drawings.

The autonomous driving ECU 55 is connected to a periphery information detection sensor group 56, which detects periphery information of the vehicle 12, and an actuator group 57, which controls running of the vehicle 12. The periphery information detection sensor group 56 includes plural sensors among various sensors, such as cameras, radar, clearance sonar, lidar (light detection and ranging or laser imaging detection and ranging), a GPS (global positioning system) sensor and so forth. The cameras image the vicinity of the vehicle 12. The radar detects distances and directions of objects in the vicinity of the vehicle 12 with electromagnetic waves. The lidar detects distances and directions of objects in the vicinity of the vehicle 12 with laser light. The GPS sensor detects a current position of the vehicle 12. In addition, the periphery information detection sensor group 56 includes a sightline detection sensor that detects a sightline of a vehicle occupant.

The actuator group 57 includes acceleration and braking actuators that regulate acceleration and deceleration of the vehicle 12, and a steering actuator that drives a steering apparatus of the vehicle 12. The autonomous driving ECU 55 implements autonomous driving of the vehicle 12 by controlling operations of the actuator group 57 in accordance with vicinity conditions of the vehicle detected by the periphery information detection sensor group 56. A planned travel path representing a route along which the vehicle 12 is planned to run is memorized in a memory section of the autonomous driving ECU 55. The autonomous driving ECU 55 causes the vehicle to run along the planned travel path memorized in the memory section.

—Functional Structures of the Display Control Device 10—

The display control device 10 uses the hardware resources described above to realize various functions. The functional structures realized by the display control device 10 are described with reference to FIG. 5.

Figure 5:
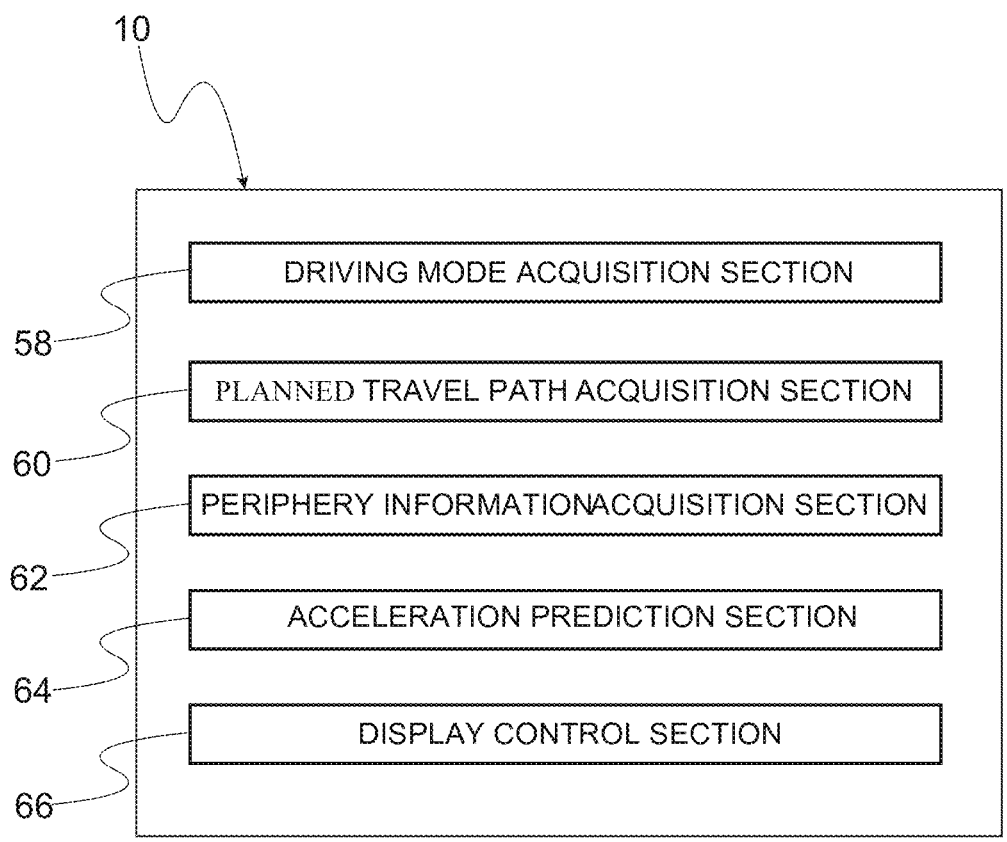
FIG. 5 is a block diagram illustrating functional structures of the vehicle display control device according to the first exemplary embodiment.

As illustrated in FIG. 5, as functional structures, the display control device 10 includes a driving mode acquisition section 58, a planned travel path acquisition section 60, a periphery information acquisition section 62, an acceleration prediction section 64 and a display control section 66. These functional structures are realized by the CPU 36 reading and executing a program memorized in the ROM 38 or the storage 42.

The driving mode acquisition section 58 acquires a driving mode of the vehicle 12, which is either a manual driving mode or an autonomous driving mode. A manual driving mode according to the present exemplary embodiment signifies a driving mode in which the vehicle 12 runs dependent on driving operations by a vehicle occupant. An autonomous driving mode according to the present exemplary embodiment signifies a driving mode in which the vehicle 12 runs in accordance with control from the autonomous driving ECU 55 without the intervention of driving operations by the vehicle occupant.

The planned travel path acquisition section 60 acquires a planned travel path of the vehicle 12. For example, when a destination location is specified at a navigation system or the like by operations by a vehicle occupant, the planned travel path acquisition section 60 acquires a planned travel path to the destination location. Further, the planned travel path acquisition section 60 may acquire, for example, a planned travel path memorized in the memory section of the autonomous driving ECU 55.

The periphery information acquisition section 62 acquires periphery information of the vehicle 12. More specifically, the periphery information acquisition section 62 acquires periphery information of the vehicle 12 from the periphery information detection sensor group 56.

On the basis of information including at least one of the planned travel path of the vehicle 12, the periphery information and information from the acceleration sensor 54, the acceleration prediction section 64 predicts directions and magnitudes of accelerations that are to act on the vehicle 12. For example, when the acceleration prediction section 64 predicts the direction and magnitude of an acceleration that is to act on the vehicle 12 on the basis of the planned travel path of the vehicle 12, the acceleration prediction section 64 predicts the direction and magnitude of the acceleration from a direction and radius of curvature of a turn in the planned travel path. If the vehicle 12 is in the autonomous driving mode at this time, the acceleration prediction section 64 may correct the magnitude of the acceleration acting on the vehicle 12 in accordance with information of the planned travel path.

When the acceleration prediction section 64 predicts the direction and magnitude of an acceleration acting on the vehicle 12 on the basis of periphery information of the vehicle 12, the acceleration prediction section 64 acquires information from the periphery information acquisition section 62. In particular, the acceleration prediction section 64 acquires information from a front camera that images in front of the vehicle 12 and a lidar that is oriented in front of the vehicle 12. When a right turn is approaching according to a state in front of the vehicle imaged by the front camera, the acceleration prediction section 64 predicts that an acceleration is to act toward the left side, which is the opposite side to the direction of the turn. The acceleration prediction section 64 may predict the magnitude of the acceleration that is to act on the vehicle 12 by computing a radius of curvature of the turn on the basis of images captured by the front camera.

When the acceleration prediction section 64 predicts the direction and magnitude of an acceleration acting on the vehicle 12 on the basis of information from the acceleration sensor 54, the acceleration prediction section 64 predicts the direction and magnitude of the acceleration from acceleration change amounts acquired from the acceleration sensor 54.

In the present exemplary embodiment, as an example, the acceleration prediction section 64 predicts the direction and magnitude of an acceleration acting on the vehicle 12 on the basis of the information of the planned travel path of the vehicle 12 and information acquired from the front camera that images in front of the vehicle 12. That is, the acceleration prediction section 64 predicts the direction and magnitude of the acceleration from the direction and radius of curvature of a turn in the planned travel path, and corrects the direction and magnitude of the predicted acceleration on the basis of actual images captured by the front camera and the speed of the vehicle 12.

When an acceleration predicted by the acceleration prediction section 64 is greater than a predetermined threshold, the display control section 66 displays the direction of the predicted acceleration at display portions in the vehicle cabin. This threshold of acceleration is, for example, specified in advance for each kind of vehicle, being set to a magnitude value that is greater than magnitudes at which vehicle occupants would not experience motion sickness.

The display control section 66 according to the present exemplary embodiment displays the directions of predicted accelerations indirectly, by the front portion display device 48, the side portion display device 50 and the lower portion display device 52 displaying flows of light at the instrument panel 14, the front pillar garnishes 20, the roof headlining 30 and the flooring material 28. Examples of displays of directions of acceleration are described in detail below.

Figure 2:
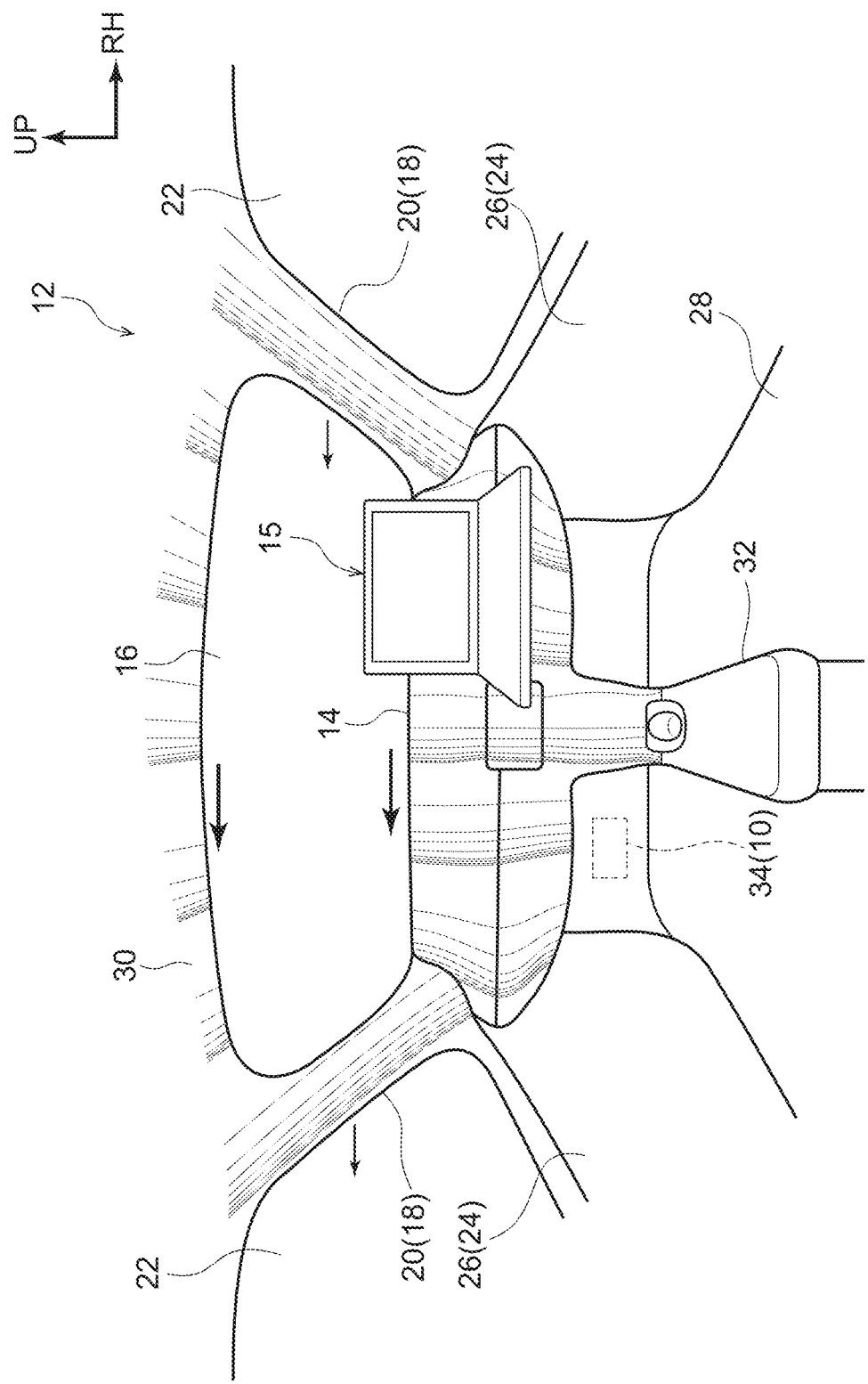
FIG. 2 is a schematic view illustrating a state in which, from the state in FIG. 1, a display at interior trim members is implemented by a display control section, which is a view illustrating a situation prior to a right turn.

First, a display by the display control section 66 at a location prior to a right turn by the vehicle 12 is described with reference to FIG. 2. On the basis of information including at least one of a predicted travel path of the vehicle 12, periphery information and information from the acceleration sensor 54, the acceleration prediction section 64 predicts that an acceleration toward the left is to act on the vehicle 12. Then, if the magnitude of the acceleration predicted by the acceleration prediction section 64 is at least the threshold, the display control section 66 operates the front portion display device 48 and causes light to be illuminated onto the instrument panel 14, the front pillar garnishes 20 and the roof headlining 30 as illustrated in FIG. 2.

More specifically, the display control section 66 illuminates plural vertical bars of light, which extend vertically as seen from the vehicle rear, onto the instrument panel 14. The display control section 66 causes the vertical bars of light to move from the right side toward the left side as indicated by an arrow in FIG. 2. Note that although arrows are illustrated for convenience of description in FIG. 2, these arrows are not displayed in reality.

The display control section 66 also illuminates plural vertical bars of light, extending vertically as seen from the vehicle rear, onto the front pillar garnishes 20. The display control section 66 causes these vertical bars of light to move from the right side toward the left side as indicated by arrows in FIG. 2.

Similarly to the instrument panel 14 and the front pillar garnishes 20, the display control section 66 illuminates plural vertical bars of light, extending vertically as seen from the vehicle rear, onto the roof headlining 30. The display control section 66 causes these vertical bars of light to move from the right side toward the left side as indicated by an arrow in FIG. 2.

Figure 3:
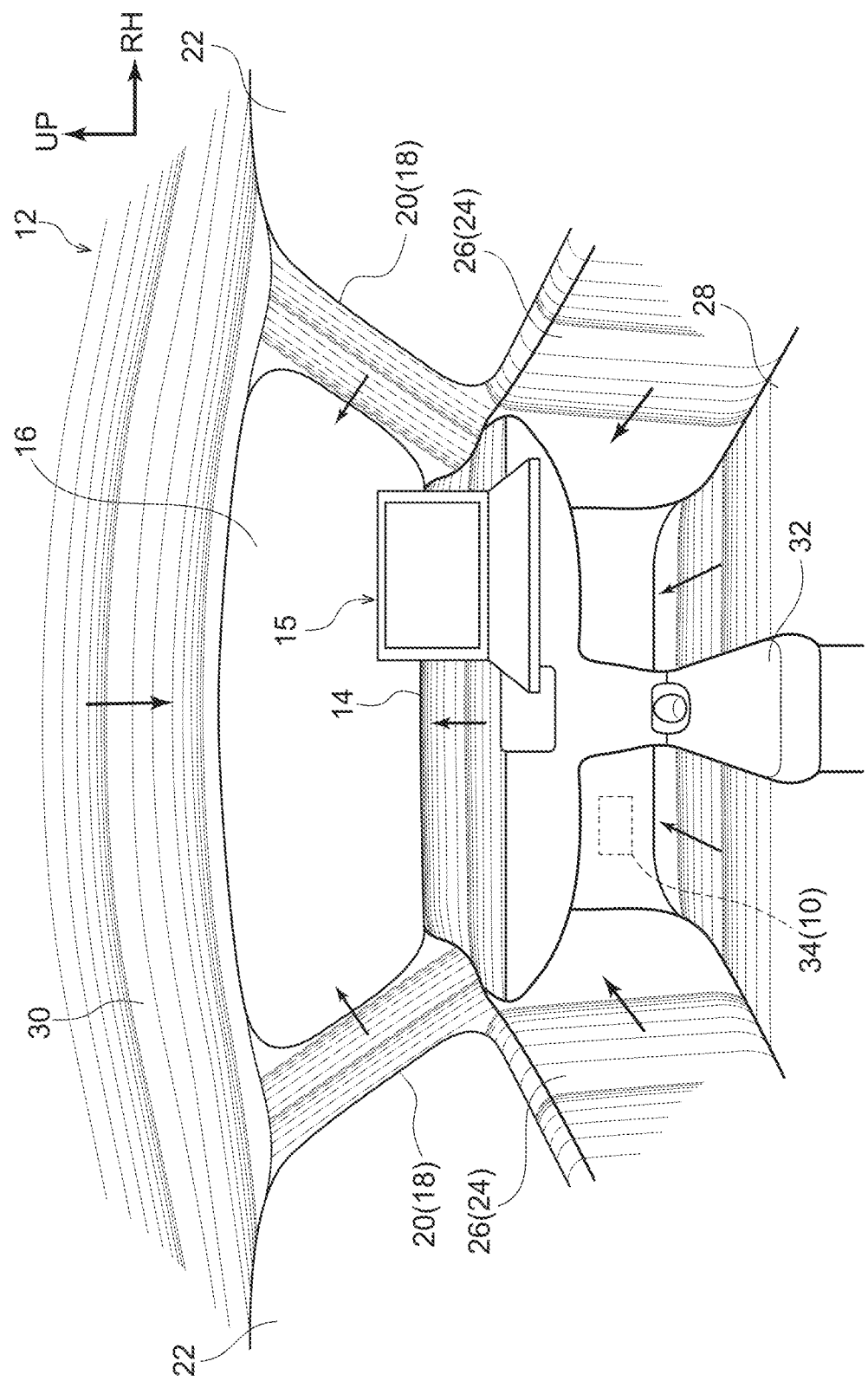
FIG. 3 is a schematic view illustrating a state in which, from the state in FIG. 1, a display at interior trim members is implemented by the display control section, which is a view illustrating a situation at a time of rapid braking.

Next, a display by the display control section 66 prior to rapid braking of the vehicle 12 is described with reference to FIG. 3. On the basis of information including at least one of a predicted travel path of the vehicle 12, periphery information and information from the acceleration sensor 54, the acceleration prediction section 64 predicts that an acceleration toward the front is to act on the vehicle 12. Then, if the magnitude of the acceleration predicted by the acceleration prediction section 64 is at least the threshold, the display control section 66 operates the front portion display device 48, side portion display device 50 and lower portion display device 52 and causes light to be illuminated onto the instrument panel 14, the front pillar garnishes 20, the roof headlining 30, the door trims 26 and the flooring material 28 as illustrated in FIG. 3.

More specifically, the display control section 66 illuminates plural horizontal bars of light, which extend left and right as seen from the vehicle rear, onto the instrument panel 14. The display control section 66 causes the horizontal bars of light to move from the rear side toward the front side as indicated by an arrow in FIG. 3. Note that although arrows are illustrated for convenience of description in FIG. 3, these arrows are not displayed in reality.

The display control section 66 also illuminates plural vertical bars of light, extending vertically as seen from the vehicle rear, onto the front pillar garnishes 20. The display control section 66 causes these vertical bars of light to move from the rear side toward the front side as indicated by arrows in FIG. 3. That is, the display control section 66 causes the light illuminated onto the front pillar garnish 20 at the right side to move toward the vehicle front-left side, away from the side glass 22 and toward the windshield glass 16. Meanwhile, the display control section 66 causes the light illuminated onto the front pillar garnish 20 at the left side to move toward the vehicle front-right side, away from the side glass 22 and toward the windshield glass 16.

The display control section 66 also illuminates plural horizontal bars of light, extending left and right as seen from the vehicle rear, onto the roof headlining 30. The display control section 66 causes these horizontal bars of light to move from the rear side toward the front side as indicated by an arrow in FIG. 3.

By operation of the side portion display device 50, the display control section 66 illuminates plural vertical bars of light, extending vertically as seen from the vehicle rear, onto the door trims 26. The display control section 66 causes these vertical bars of light to move from the rear side toward the front side as indicated by arrows in FIG. 3.

By operation of the lower portion display device 52, the display control section 66 illuminates plural horizontal bars of light, extending left and right as seen from the vehicle rear, onto the flooring material 28. The display control section 66 causes these horizontal bars of light to move from the rear side toward the front side as indicated by arrows in FIG. 3.

As described above, the display control section 66 displays that an acceleration toward the front is to act on the vehicle 12 by causing light illuminated onto interior trim members to move from the rear side toward the front side. Conversely, an acceleration toward the rear acting on the vehicle 12 is displayed by the display control section 66 causing light illuminated onto interior trim members to move from the front side toward the rear side.

The display control section 66 according to the present exemplary embodiment alters at least one of a color of the light, brightness, and a flow speed of the light in accordance with the magnitude of an acceleration predicted by the acceleration prediction section 64. For example, the display control section 66 makes the light brighter when the magnitude of a predicted acceleration is relatively large than when the magnitude is relatively small. The display control section 66 illuminates light with a green color when the magnitude of a predicted acceleration is relatively small, and illuminates light with a red color when the magnitude of a predicted acceleration is relatively large. The display control section 66 makes a flow speed of the light faster when the magnitude of a predicted acceleration is relatively large than when the magnitude is relatively small.

When the acceleration prediction section 64 predicts that accelerations greater than the predetermined threshold are to act in plural directions, the display control section 66 displays the direction in which the largest of the accelerations is to act. For example, when the vehicle 12 commences a right turn while reducing speed, an acceleration acting to the front side of the vehicle 12 and an acceleration acting to the left side of the vehicle 12 may exceed the predetermined threshold. In this situation, the display control section 66 displays the direction in which the larger acceleration is to act.

The display control section 66 according to the present exemplary embodiment is configured to implement displays only when the driving mode of the vehicle 12 is the autonomous driving mode.

—Operation—

Now, operation of the present exemplary embodiment is described.

—Display Processing—

Figure 6:
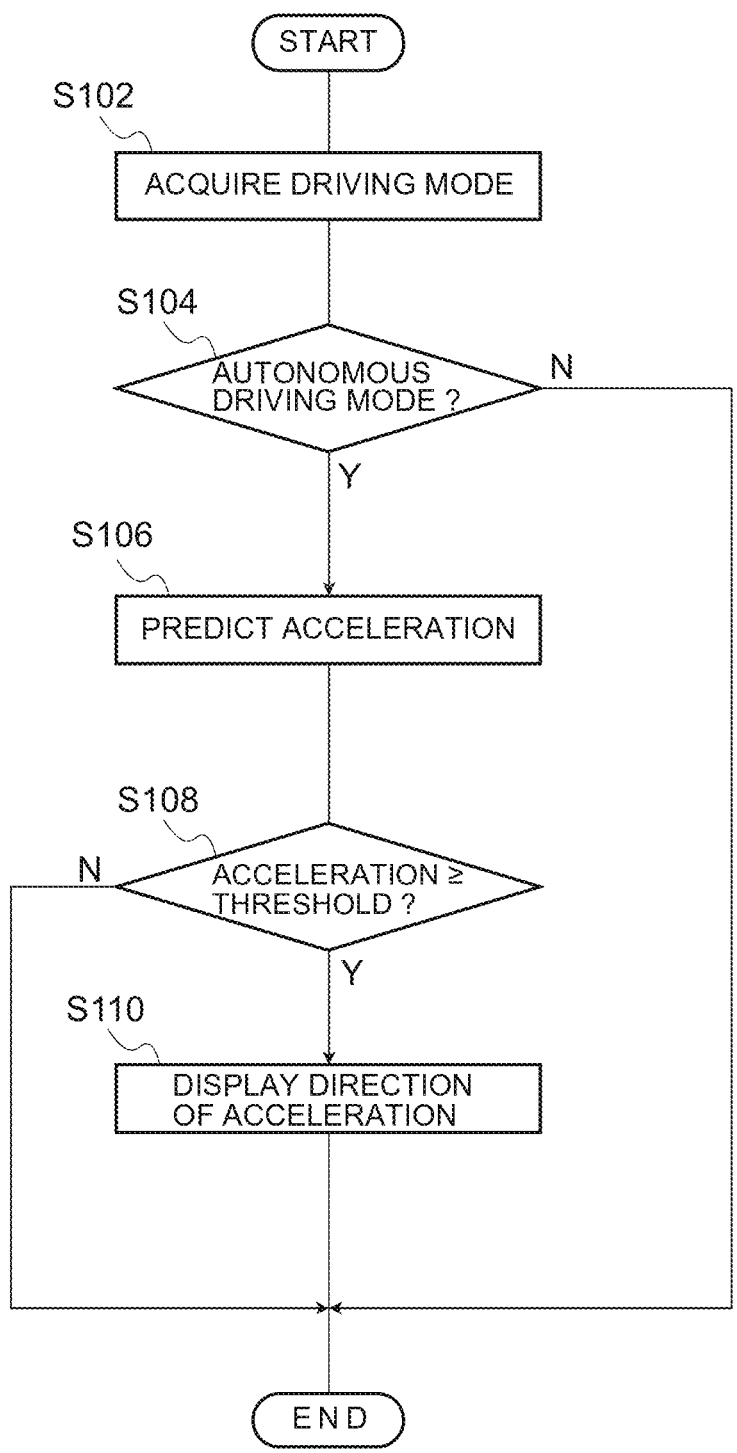
FIG. 6 is a flowchart illustrating an example of a flow of display processing according to the first exemplary embodiment.

An example of display processing that displays directions of accelerations is described using the flow chart illustrated in FIG. 6. This display processing is implemented by the CPU 36 reading a display program from the ROM 38 or storage 42, loading the display program into the RAM 40, and executing the program.

As illustrated in FIG. 6, in step S102 the CPU 36 acquires the driving mode. More specifically, by the functioning of the driving mode acquisition section 58, the CPU 36 acquires the driving mode of the vehicle 12, which is either of a manual driving mode and an autonomous driving mode.

In step S104, the CPU 36 makes a determination as to whether the driving mode of the vehicle 12 is the autonomous driving mode. When the CPU 36 determines that the driving mode is the autonomous driving mode, the CPU 36 proceeds to the processing of step S106. On the other hand, when the CPU 36 determines that the driving mode is the manual driving mode, the result of the determination in step S104 is negative and the CPU 36 ends the display processing.

In step S106, the CPU 36 predicts a direction and magnitude of an acceleration that is to act on the vehicle 12. More specifically, by the functioning of the acceleration prediction section 64, the CPU 36 predicts the direction and magnitude of an acceleration acting on the vehicle 12 on the basis of information including at least one of a planned travel path of the vehicle 12, periphery information and information from the acceleration sensor 54.

In step S108, the CPU 36 makes a determination as to whether the magnitude of the acceleration is at least the predetermined threshold. When the CPU 36 determines that the magnitude of the acceleration is equal to or greater than the threshold, the CPU 36 proceeds to the processing of step S110. On the other hand, when the CPU 36 determines that the magnitude of the acceleration is smaller than the threshold, the result of the determination in step S108 is negative and the CPU 36 ends the display processing.

In step S110, the CPU 36 displays the direction of the acceleration. More specifically, by the functioning of the display control section 66, the CPU 36 displays the direction of the acceleration predicted in step S106 at display portions in the vehicle cabin. In the present exemplary embodiment as described above, when an acceleration is predicted to act in the left-and-right direction of the vehicle 12, the front portion display device 48 is operated by the display control section 66 and light is illuminated onto the instrument panel 14, the front pillar garnishes 20 and the roof headlining 30. Alternatively, when an acceleration is predicted to act in the front-and-rear direction of the vehicle 12, the front portion display device 48, the side portion display device 50 and the lower portion display device 52 are operated by the display control section 66 and light is illuminated onto the instrument panel 14, the front pillar garnishes 20, the roof headlining 30, the door trims 26 and the flooring material 28.

In the present exemplary embodiment as described above, the direction of an acceleration is displayed at the interior trim members before the acceleration acts on the vehicle 12. Therefore, a vehicle occupant may instinctively understand the direction in which the acceleration is to act before a movement of the vehicle 12. As a result, motion sickness is less likely.

Because directions of acceleration are displayed at various interior trim members in the vehicle cabin, the vehicle occupant may recognize the direction of an acceleration displayed at the interior trim members without effort, and may intuitively understand the direction in which the acceleration is to act without paying attention to a vicinity of the driver seat.

In particular, because the display control section 66 according to the present exemplary embodiment illustrates the direction in which an acceleration is to act by a flow direction of light, the direction in which the acceleration is to act may be understood more intuitively than if the direction is displayed by text or the like.

In the present exemplary embodiment, one or more of a color of light, brightness, and flow speed of light is altered in accordance with the magnitude of a predicted acceleration. As a result, as well as the direction in which the acceleration is to act, a vehicle occupant may intuitively understand the magnitude of the acceleration.

In the present exemplary embodiment, when accelerations greater than the predetermined threshold are predicted to act in plural directions by the acceleration prediction section 64, the display control section 66 displays only the direction in which the largest of the accelerations is to act. Therefore, a vehicle occupant may be less likely to be confused than in a case in which the plural directions of acceleration are displayed.

Because accelerations are displayed only when the driving mode is the autonomous driving mode, the display of directions of accelerations is suspended when in the manual driving mode, in which a vehicle occupant is driving. Therefore, the vehicle occupant may concentrate on driving.

Second Exemplary Embodiment

Now, a vehicle display control device 70 according to a second exemplary embodiment is described with reference to the drawings. Structures that are the same as in the first exemplary embodiment are assigned the same reference symbols and, as appropriate, are not described.

Figure 7:
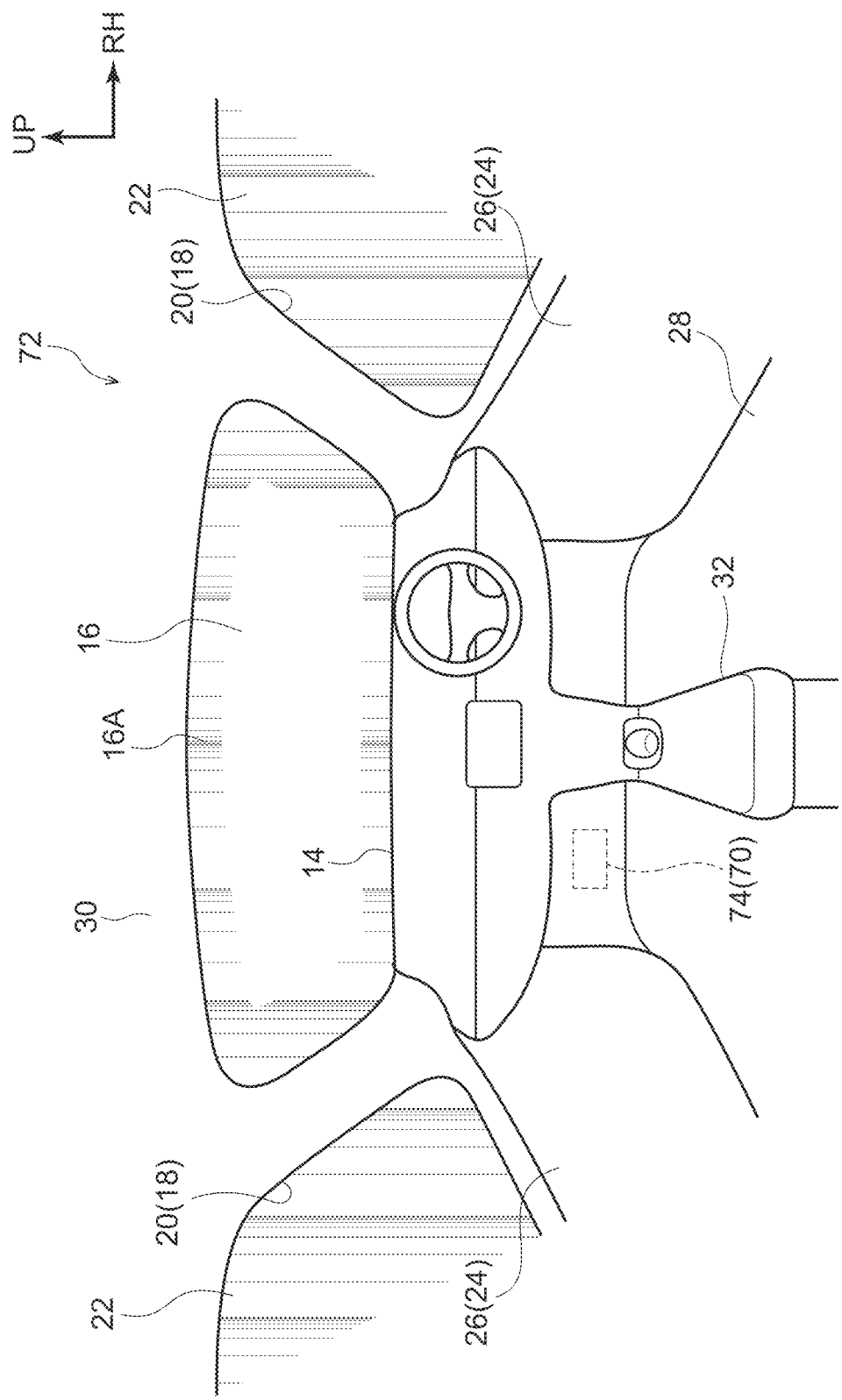
FIG. 7 is a schematic view of a front region of a cabin of a vehicle in which a vehicle display control device according to a second exemplary embodiment is employed, viewed from the vehicle rear side, which is a view illustrating a state in which a display at a windshield glass and side glasses is implemented by a display control section.

As illustrated in FIG. 7, a vehicle 72 in which the vehicle display control device 70 according to the present exemplary embodiment (below referred to simply as "the display control device 70") is employed differs from the first exemplary embodiment in that light is displayed at the windshield glass 16 and the side glasses 22.

More specifically, a display region 16A is specified at outer periphery portions of the windshield glass 16. For example, the windshield glass 16 has a structure in which a coating glass that is coated with an electrically conductive material is superposed with reinforced glass. In the display region 16A, plural light-emitting diodes (LEDs) are disposed between the reinforced glass and the coating glass. Light is displayed in the display region 16A by the LEDs being caused to emit light in predetermined light emission patterns.

The whole areas of the left and right side glasses 22 are specified to be display regions. More specifically, LEDs are disposed in the whole of each side glass 22 between a coating glass and reinforced glass structuring the side glass 22. Light is displayed at the whole of the side glass 22 by the LEDs being caused to emit light in predetermined light emission patterns.

An electronic control unit (ECU) 74 that constitutes the display control device 70 is provided at the vehicle front side of the instrument panel 14. Hardware structures of the ECU 74 are similar to the first exemplary embodiment illustrated in FIG. 4. It is sufficient that the front portion display device 48, side portion display device 50 and acceleration sensor 54 are electronically connected to the input/output interface 44 of the ECU 74; the lower portion display device 52 need not be provided.

The front portion display device 48 according to the present exemplary embodiment includes the plural LEDs provided at the display region 16A of the windshield glass 16 and a control device that controls light emission patterns of the LEDs. The side portion display device 50 according to the present exemplary embodiment includes the plural LEDs provided at the side glasses 22 and a control device that controls light emission patterns of these LEDs.

Similarly to the first exemplary embodiment illustrated in FIG. 5, the display control device 70 includes, as functional structures, the driving mode acquisition section 58, the planned travel path acquisition section 60, the periphery information acquisition section 62, the acceleration prediction section 64 and the display control section 66. These functional structures are realized by the CPU 36 reading and executing a program memorized in the ROM 38 or the storage 42.

When the magnitude of an acceleration predicted by the acceleration prediction section 64 prior to a right turn or prior to a left turn is equal to or greater than the threshold, the display control section 66 operates the front portion display device 48 and causes the LEDs disposed in the display region 16A to emit light in a predetermined light emission pattern. FIG. 7 illustrates an example in which the LEDs of the display region 16A emit light in a light emission pattern prior to a right turn. That is, the display control section 66 causes the LEDs to emit light such that vertical bars of light are displayed in the display region 16A as seen by a vehicle occupant and the vertical bars of light move from the right side toward the left side. Thus, the display control section 66 displays that an acceleration toward the left is to act on the vehicle 72.

Conversely, the display control section 66 displays that an acceleration toward the right is to act on the vehicle 72 by causing the LEDs to emit light such that vertical bars of light displayed in the display region 16A move from the left side toward the right side as seen by the vehicle occupant.

When the magnitude of an acceleration toward the front that is predicted by the acceleration prediction section 64 prior to rapid braking of the vehicle 72 is equal to or greater than the threshold, the display control section 66 operates the front portion display device 48 and side portion display device 50 and causes the LEDs disposed in the display region 16A and the side glasses 22 to emit light in a predetermined light emission pattern.

More specifically, the display control section 66 operates the front portion display device 48 and causes the LEDs at the display region 16A to emit light such that the light is displayed in frame shapes and the light moves to contract from outer edges of the windshield glass 16 towards the center. Thus, the display control section 66 displays that an acceleration toward the front is to act on the vehicle 72.

The display control section 66 also operates the side portion display device 50 and causes the LEDs at the left and right side glasses 22 to emit light such that the light displayed at the side glasses 22 moves from rear portions towards front portions of the side glasses 22. Thus, the display control section 66 displays that the acceleration toward the front is to act on the vehicle 72. The side glasses 22 illustrated in FIG. 7 show a state in which the LEDs are emitting light in the light emission pattern for when an acceleration toward the front is predicted to act.

Alternatively, when the magnitude of an acceleration toward the rear that is predicted by the acceleration prediction section 64 prior to a rapid acceleration of the vehicle 72 is equal to or greater than the threshold, the display control section 66 causes the LEDs to emit light such that light is displayed in frame shapes at the display region 16A and the light moves to expand away from the center of the windshield glass 16 towards the outer edges. The display control section 66 also causes the LEDs at the left and right side glasses 22 to emit light such that the light displayed at the side glasses 22 moves from the front portions towards the rear portions of the side glasses 22.

This display control section 66 alters at least one of a color of the light, brightness, and a flow speed of the light in accordance with the magnitude of an acceleration predicted by the acceleration prediction section 64. For example, the display control section 66 makes the light brighter when the magnitude of a predicted acceleration is relatively large than when the magnitude is relatively small. The display control section 66 illuminates light with a green color when the magnitude of a predicted acceleration is relatively small and illuminates light with a red color when the magnitude of a predicted acceleration is relatively large. The display control section 66 also alters the light emission patterns of the LEDs so as to make a flow speed of the light faster when the magnitude of a predicted acceleration is relatively large than when the magnitude is relatively small.

—Operation—

Now, operation of the present exemplary embodiment is described.

In the display control device 70 according to the present exemplary embodiment, displays are implemented at the windshield glass 16 and the side glasses 22. Therefore, a vehicle occupant may intuitively understand movements of the vehicle even when the vehicle occupant is looking at external scenes through the windshield glass 16 and when the vehicle occupant is looking at external scenes through the side glasses 22. Other operations are similar to the first exemplary embodiment.

Third Exemplary Embodiment

Now, a vehicle display control device 80 according to a third exemplary embodiment is described with reference to the drawings. Structures that are the same as in the first exemplary embodiment are assigned the same reference symbols and, as appropriate, are not described.

Figure 8:
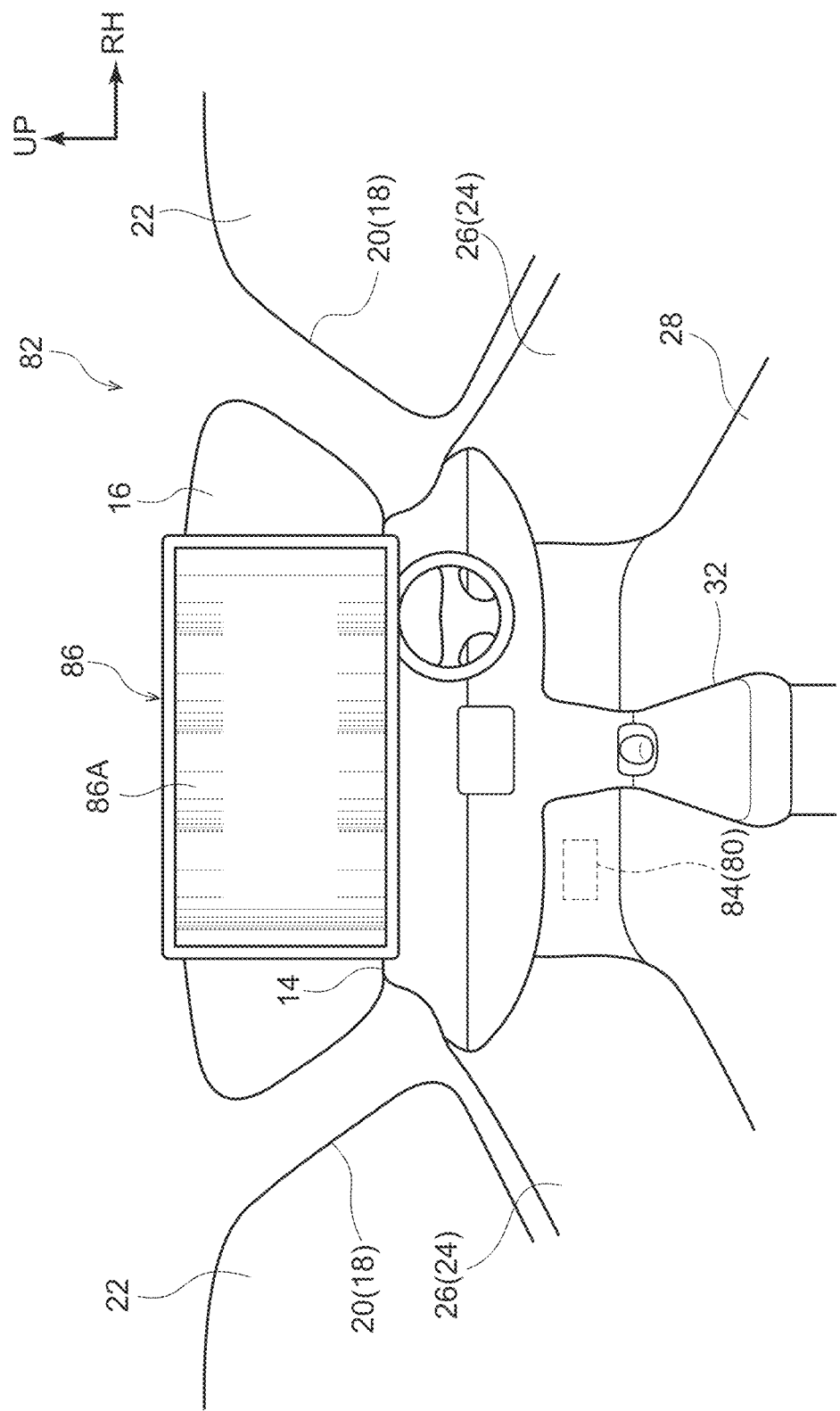
FIG. 8 is a schematic view of a front region of a cabin of a vehicle in which a vehicle display control device according to a third exemplary embodiment is employed, viewed from the vehicle rear side, which is a view illustrating a state in which a display at a monitor is implemented by a display control section.

As illustrated in FIG. 8 and FIG. 10, a vehicle 82 in which the vehicle display control device 80 according to the present exemplary embodiment (below referred to simply as "the display control device 80") is employed differs from the first exemplary embodiment in that light is displayed at a monitor 86 and a computer 88.

More specifically, in the vehicle 82 according to the present exemplary embodiment, the monitor 86 is hung from the ceiling portion of the vehicle cabin and is structured such that a vehicle occupant on a rear seat may watch images displayed on the monitor 86. The location of the monitor 86 is not particularly limited; the monitor 86 may be provided at a location at which both a vehicle occupant on a front seat and a vehicle occupant on a rear seat may watch the monitor 86.

A display region 86A that displays directions of accelerations is specified at outer periphery end portions of the monitor 86. The display region 86A is a portion of a display region for images. Therefore, in a state in which no directions of accelerations are displayed such as, for example, when the driving mode is the manual driving mode and the like, images are displayed by the whole of the monitor 86. In contrast, when the direction of an acceleration is to be displayed in the autonomous driving mode or the like, the display region for images is reduced and the display region 86A for displaying the direction of the acceleration is specified at the outer periphery end portions of the monitor 86.

Figure 9A:
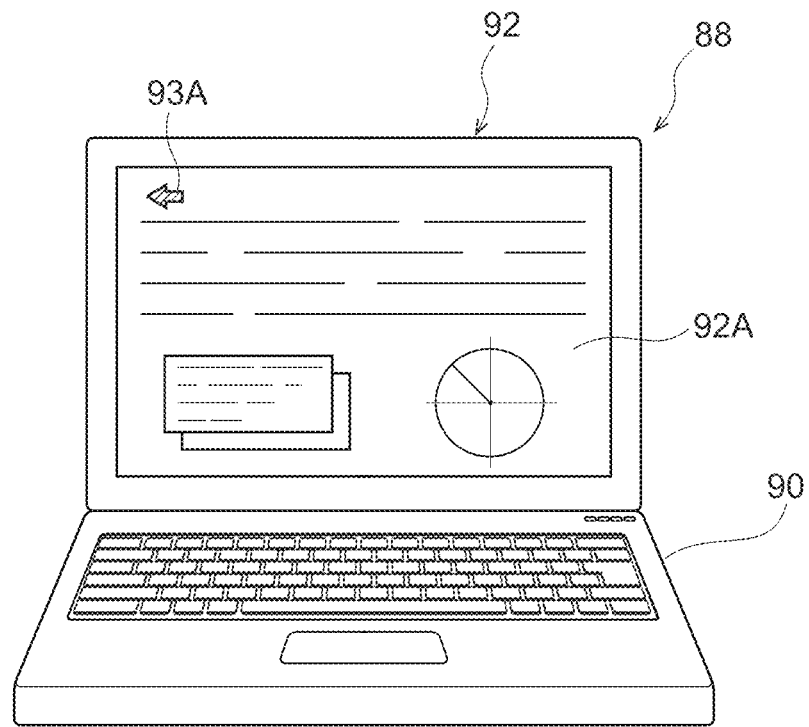
FIG. 9A is a view illustrating a state in which a display is implemented at a screen of a computer by the display control section according to the third exemplary embodiment, which illustrates a situation in which a relatively small acceleration is predicted to act in a vehicle left direction.

As illustrated in FIG. 9A, the vehicle 82 is provided with the computer 88 inside the vehicle cabin. The computer 88 may be, for example, a notebook computer that is installed in the vehicle cabin in a stowable state. Alternatively, the computer 88 may be a laptop computer that a vehicle occupant brings in from outside the vehicle. The computer 88 includes a control portion 90 equipped with a keyboard and touchpad and a display portion 92 equipped with a display region 92A at which information and the like is displayed.

The display control device 80 according to the present exemplary embodiment is configured to display the directions of accelerations as arrows in the display region 92A of the computer 88. In FIG. 9A, an arrow 93A is displayed at the upper left of the display region 92A; the direction of the arrow 93A is toward the left. Thus, the display control device 80 directly reports to a vehicle occupant that an acceleration that is to act on the vehicle 82 is toward the left.

As illustrated in FIG. 8, an electronic control unit (ECU) 84 that constitutes the display control device 80 is provided at the vehicle front side of the instrument panel 14.

—Hardware Structures of the Display Control Device 80—

FIG. 10 is a block diagram illustrating hardware structures of the display control device 10. As illustrated in FIG. 10, similarly to the first exemplary embodiment, the ECU 84 constituting the display control device 80 includes the CPU 36, the ROM 38, the RAM 40, the storage 42 and the input/output interface 44. These structures are connected to be capable of communicating with one another via a bus 46.

The input/output interface 44 is electronically connected with the monitor 86 and the computer 88. In this configuration, the input/output interface 44 is not connected with the computer 88 by a cable but by wireless communications. Predetermined software for displaying arrows in the display region 92A is installed in the computer 88.

Similarly to the first exemplary embodiment illustrated in FIG. 5, the display control device 80 includes, as functional structures, the driving mode acquisition section 58, the planned travel path acquisition section 60, the periphery information acquisition section 62, the acceleration prediction section 64 and the display control section 66. These functional structures are realized by the CPU 36 reading and executing a program memorized in the ROM 38 or the storage 42.

When the magnitude of an acceleration predicted by the acceleration prediction section 64 prior to a right turn or prior to a left turn is equal to or greater than the threshold, the display control section 66 according to the present exemplary embodiment causes the monitor 86 and computer 88 to display the direction of the acceleration.

FIG. 8 depicts a display example of the display region 86A prior to a right turn. That is, the display control section 66 implements display such that vertical bars are displayed in the display region 86A and the vertical bars move from the right side toward the left side as seen by a vehicle occupant. Thus, the display control section 66 displays that an acceleration toward the left is to act on the vehicle 82.

Conversely, the display control section 66 displays that an acceleration towards the right is to act on the vehicle 82 by causing vertical bars displayed in the display region 86A to move from the left side toward the right side as seen by the vehicle occupant.

Prior to rapid braking of the vehicle 82, the display control section 66 causes lines in frame shapes to be displayed in the display region 86A and causes the lines in frame shapes to move so as to progressively contract towards the center of the monitor 86. Thus, the display control section 66 displays that an acceleration toward the front is to act on the vehicle 82. Conversely, prior to a rapid acceleration of the vehicle 82, the display control section 66 displays that an acceleration toward the rear is to act on the vehicle 82 by displaying lines in frame shapes in the display region 86A and causing the lines in frame shapes to move so as to progressively expand away from the center of the monitor 86.

The display control section 66 alters at least one of a color of the lines, brightness, and a flow speed of the lines in accordance with the magnitude of an acceleration predicted by the acceleration prediction section 64.

FIG. 9A depicts a display example of the computer 88 prior to a right turn. That is, the display control section 66 displays that the direction of a predicted acceleration is toward the left by displaying the leftward arrow 93A at the upper left of the display region 92A of the display portion 92. Conversely, when the direction of a predicted acceleration is toward the right, the display control section 66 displays an arrow toward the right at the upper left of the display region 92A of the display portion 92.

Prior to rapid braking of the vehicle 82, the display control section 66 directly displays that an acceleration toward the front is to act on the vehicle 82 by displaying, for example, the text "sudden braking" at the upper left of the display region 92A. Conversely, prior to a rapid acceleration of the vehicle 82, the display control section 66 directly displays that an acceleration toward the rear is to act on the vehicle 82 by displaying, for example, the text "sudden acceleration" at the upper left of the display region 92A.

Figure 9B:
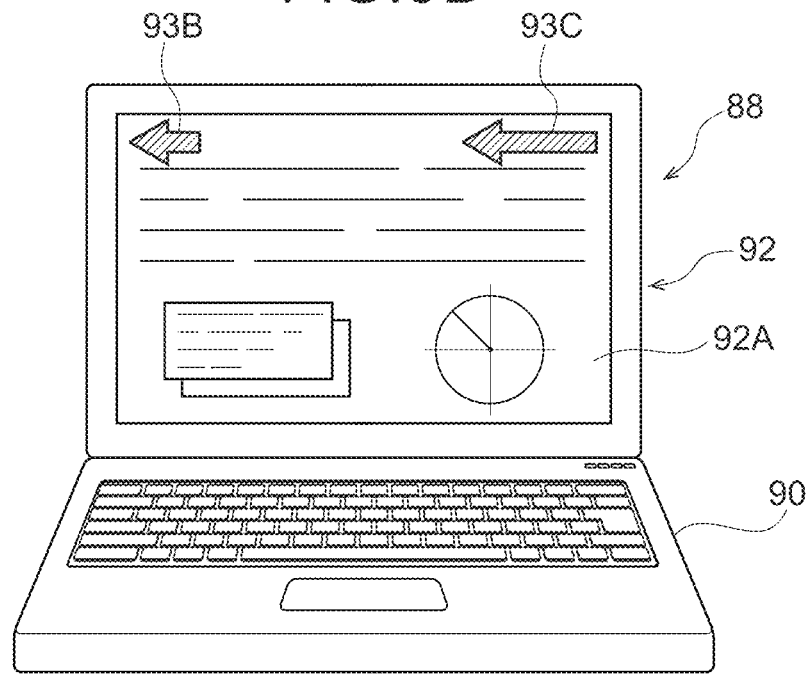
FIG. 9B is a view illustrating a state in which a display is implemented at the screen of the computer by the display control section according to the third exemplary embodiment, which illustrates a situation in which a relatively large acceleration is predicted to act in the vehicle left direction.

The display control section 66 alters at least one of color, brightness and size of the arrow in accordance with the magnitude of an acceleration predicted by the acceleration prediction section 64. For example, when an acceleration acting toward the left is predicted by the acceleration prediction section 64 to be larger than in the case illustrated in FIG. 9A, the size of the arrow is displayed larger as in the display example depicted in FIG. 9B. In FIG. 9B, an arrow 93B toward the left is displayed at the upper left of the display region 92A. The arrow 93B is displayed larger than the arrow 93A in FIG. 9A. In addition in FIG. 9B, an arrow 93C toward the left is displayed at the upper right of the display region 92A. Thus, the fact that the acceleration that is to act toward the left is large is reported to the vehicle occupant.

The display control section 66 may also alter the color of the arrow in accordance with the magnitude of an acceleration predicted by the acceleration prediction section 64. For example, the arrow 93A may be displayed in green or a color close to green when an acceleration predicted by the acceleration prediction section 64 is relatively small, and the arrow 93A may be displayed in red or a color close to red when a predicted acceleration is relatively large.

—Operation—

Now, operation of the present exemplary embodiment is described.

In the display control device 80 according to the present exemplary embodiment, the direction of a predicted acceleration is displayed at the monitor 86 and the computer 88. Therefore, even in a state in which a vehicle occupant is paying attention to the monitor 86 and computer 88 or the like, the vehicle occupant may instinctively understand the direction in which the acceleration is to act.

In the present exemplary embodiment, because the display control section 66 directly displays the direction of an acceleration by text or an arrow in the display region 92A of the computer 88, a vehicle occupant may be less likely to misrecognize the direction in which the acceleration is to act than in situations in which patterns, movements and the like are displayed.

In the present exemplary embodiment, because at least one of the color, brightness and size of an arrow is altered in accordance with the magnitude of an acceleration predicted by the acceleration prediction section 64, magnitudes of accelerations may also be instinctively understood. Other operations are similar to the first exemplary embodiment.

Above, vehicle display control devices 10, 70 and 80 according to the first to third exemplary embodiments are described, but it will be clear that numerous embodiments are possible within a scope not departing from the gist of the present disclosure. For example, the exemplary embodiments described above have configurations in which the direction of a predicted acceleration is displayed at display portions in a cabin, but this is not limiting. A direction of motion of a vehicle may be predicted and the predicted direction of motion may be displayed at interior trim members.

An example of a display control device that indirectly displays a predicted direction of motion at interior trim members is described below. For example, in the functional structures of the first exemplary embodiment illustrated in FIG. 5, the display control device is equipped with the functions of a direction of motion prediction section instead of the acceleration prediction section 64. The direction of motion prediction section predicts a direction of motion of the vehicle on the basis of a planned travel path of the vehicle and periphery information. When a direction of motion of the vehicle predicted by the direction of motion prediction section is greater than a predetermined steering angle, the display control section 66 displays the direction of motion of the vehicle at the instrument panel 14 and the front pillar garnishes 20 (see FIG. 2).

For example, prior to a right turn by the vehicle, the display control section 66 may display vertical bars of light that move from the left side toward the right side at the instrument panel 14 and the front pillar garnishes 20. Conversely, prior to a left turn by the vehicle, the display control section 66 may display vertical bars of light that move from the right side toward the left side at the instrument panel 14 and the front pillar garnishes 20. Further, the display control section 66 may implement similar displays at the flooring material 28 and the roof headlining 30. Therefore, without paying attention to a vicinity of the driver seat, a vehicle occupant may intuitively understand movements of the vehicle by seeing directions of motion displayed at interior trim members.

In the first exemplary embodiment described above, when accelerations larger than the predetermined threshold are predicted to act in plural directions by the acceleration prediction section 64, the display control section 66 is configured to display the direction in which the largest of the accelerations acts, but this is not limiting. For example, degrees of priority may be specified for display directions in advance and accelerations acting in the front-and-rear direction may be displayed with priority. For example, when accelerations larger than the predetermined threshold are predicted to act toward the front and toward the right by the acceleration prediction section 64, the display control section 66 displays the acceleration acting toward the front with priority. When accelerations acting in the front-and-rear direction are displayed with priority in this way, vehicle occupants may prepare for inertial forces in the front-and-rear direction that act on the vehicle occupants, particularly at times of rapid braking and times of rapid acceleration of the vehicle.

Alternatively, accelerations that act in the left-and-right direction may be displayed with priority. For example, when accelerations larger than the predetermined threshold are predicted to act toward the front and toward the right by the acceleration prediction section 64, the display control section 66 displays the acceleration acting toward the right with priority. When accelerations acting in the left-and-right direction are displayed with priority in this way, vehicle occupants may prepare for inertial forces in the vehicle left-and-right direction that act on the vehicle occupants, particularly prior to turning.

The exemplary embodiments described above have configurations in which the direction of a predicted acceleration is displayed at all of display portions specified in advance, but this is not limiting. For example, a configuration is possible in which the direction of a predicted acceleration is displayed only at display portions disposed in a direction in which a vehicle occupant is facing.

In this configuration, the vehicle display control device is equipped with the functions of a sightline direction acquisition section that acquires a sightline direction from a sightline detection sensor that detects the sightline of the vehicle occupant. Hence, the display control section displays the direction of an acceleration in the sightline of the vehicle occupant acquired by the sightline direction acquisition section.

For example, as illustrated in FIG. 1, in a structure in which the computer 15 is provided at the driver seat, the vehicle occupant may use the computer 15 to carry out operations during running of the vehicle. In this situation, on the basis of information from the sightline direction acquisition section, the vehicle display control device determines that the sightline of the vehicle occupant is oriented to the computer 15. Then, when the acceleration prediction section 64 predicts that an acceleration greater than the predetermined threshold is to act, the display control section 66 displays the direction of the acceleration at the monitor of the computer 15 as illustrated in FIG. 9A.

If the vehicle occupant lowers their sightline away from the computer 15, on the basis of information from the sightline direction acquisition section, the vehicle display control device determines that the sightline of the vehicle occupant is oriented toward the lower side of the vehicle cabin. In this situation, when the acceleration prediction section 64 predicts that an acceleration greater than the predetermined threshold is to act, the display control section 66 displays the direction of the acceleration at the flooring material 28, in the sightline of the vehicle occupant. Further, when the vehicle is a vehicle in which the orientation of a vehicle seat can be altered, the sightline direction acquisition section may be configured to acquire the direction in which the vehicle occupant is facing by acquiring the orientation of the vehicle seat.

In the exemplary embodiments described above, cases of displaying accelerations acting in the vehicle front-and-rear direction and cases of displaying accelerations acting in the vehicle left-and-right direction are described, but this is not limiting. For example, accelerations acting in the vehicle vertical direction may be predicted and displayed. That is, in a place where a road surface is formed with bumps and dips, accelerations acting toward the upper side may be displayed at display portions. For example, an acceleration toward the upper side that is to act on the vehicle may be displayed by plural horizontal bars being displayed at the front pillar garnishes 20 and the horizontal bars being moved from the lower side toward the upper side.

In the exemplary embodiments described above, configurations in which the threshold for displaying an acceleration may be altered are possible. For example, information of vehicle occupants may be registered with the vehicle in advance, and when a vehicle occupant who is susceptible to motion sickness is riding in the vehicle, the threshold may be lowered. Hence, displays may be implemented even when relatively small accelerations are to act. On the other hand, when only vehicle occupants with little susceptibility to motion sickness are riding, the threshold may be raised. Hence, annoyance due to directions of accelerations being displayed frequently may be alleviated.

As illustrated in FIG. 8, FIG. 9A and FIG. 9B, the third exemplary embodiment described above has a configuration in which the directions of predicted accelerations are displayed at the monitor 86 and the computer 88. In addition thereto, the directions of predicted accelerations may be displayed at a portable terminal carried by a vehicle occupant.

The exemplary embodiments described above have configurations in which the acceleration prediction section 64 predicts the directions and magnitudes of accelerations acting on the vehicle on the basis of information including at least one of a planned travel path of the vehicle, periphery information, and information from the acceleration sensor 54. However, configurations are possible that predict directions and magnitudes of accelerations taking account of other information. For example, the directions and magnitudes of accelerations may be predicted taking account of a number of vehicle occupants riding in the vehicle and a weight of luggage loaded in the vehicle. Further, data of vehicles running along the same road may be collected in a cloud, and directions and magnitudes of accelerations may be predicted taking account of this data. Further yet, vehicle-to-vehicle communications may be conducted with a vehicle running in front of the present vehicle and data may be acquired from the leading vehicle. Further, communications may be conducted with a smartphone that has been brought into the vehicle, and directions and magnitudes of accelerations may be predicted taking account of information acquired from an acceleration sensor, a gyro sensor and the like installed in the smartphone.

What is claimed is:

1. A vehicle display control device, comprising a processor, wherein the processor is configured to:
    predict a direction of an acceleration acting on a vehicle based on information including at least one of:
        information regarding a planned travel path of the vehicle,
        information acquired from a periphery information detection sensor configured to detect information regarding a vehicle periphery, or
        information acquired from an acceleration sensor configured to detect an acceleration of the vehicle;
    in a case in which a predicted acceleration is greater than a predetermined threshold, display a direction of the predicted acceleration at a display portion in a vehicle cabin; and
    display an acceleration acting in a vehicle front-and-rear direction with priority in a case in which accelerations greater than the predetermined threshold are predicted to act on the vehicle in a plurality of directions.

2. The vehicle display control device according to claim 1, wherein
    the processor is configured to display the direction of the predicted acceleration at at least one of interior trim members including a pillar garnish, a door trim, an instrument panel, a roof headlining and a flooring material.

3. The vehicle display control device according to claim 1, wherein
    the processor is configured to display the direction of the predicted acceleration at at least one of a windshield glass or a side glass.

4. The vehicle display control device according to claim 1, wherein
    the processor is configured to display the direction of the predicted acceleration at at least one of image display portions selected from a group consisting of a monitor provided in the vehicle cabin and a portable terminal.

5. The vehicle display control device according to claim 1, wherein
    the processor is configured to display the direction of the predicted acceleration by displaying a flow of light.

6. The vehicle display control device according to claim 5, wherein
    the processor is configured to alter at least one of a color, a brightness or a flow speed of the light in accordance with a magnitude of the predicted acceleration.

7. The vehicle display control device according to claim 1, wherein
    the processor is configured to display the direction of the predicted acceleration by displaying text or an arrow.

8. The vehicle display control device according to claim 7, wherein
    the processor is configured to alter at least one of a color, a brightness or a size of the text or arrow in accordance with a magnitude of the predicted acceleration.

9. The vehicle display control device according to claim 1, wherein
    the processor is configured to, in the case in which the accelerations greater than the predetermined threshold are predicted to act on the vehicle in the plurality of directions, display a direction in which a largest of the accelerations is to act.

10. A vehicle display control device according to claim 1, comprising a processor, wherein the processor is configured to:
    predict a direction of an acceleration acting on a vehicle based on information including at least one of:
        information regarding a planned travel path of the vehicle,
        information acquired from a periphery information detection sensor configured to detect information regarding a vehicle periphery, or
        information acquired from an acceleration sensor configured to detect an acceleration of the vehicle;
    in a case in which a predicted acceleration is greater than a predetermined threshold, display a direction of the predicted acceleration at a display portion in a vehicle cabin; and
    display an acceleration acting in a vehicle left-and-right direction with priority in a case in which accelerations greater than the predetermined threshold are predicted to act on the vehicle in a plurality of directions.

11. The vehicle display control device according to claim 1, wherein
    the processor is configured to:
        acquire a direction in which a vehicle occupant is facing by acquiring one of a sightline direction of the vehicle occupant or an orientation of a vehicle seat; and
        display the direction of the acceleration in an acquired sightline of the vehicle occupant.

12. The vehicle display control device according to claim 1, wherein
    the processor is configured to:
        display the direction of the predicted acceleration in a case in which a driving mode of the vehicle is an autonomous driving mode; and
        suspend the display of the direction of the predicted acceleration in a case in which the driving mode is a manual driving mode.

13. An acceleration display method executed by a processor, the method comprising:
    predicting a direction of an acceleration acting on a vehicle based on information including at least one of:
        information regarding a planned travel path of the vehicle,
        information acquired from a periphery information detection sensor configured to detect information regarding a vehicle periphery, or
        information acquired from an acceleration sensor configured to detect an acceleration of the vehicle;
    in a case in which a predicted acceleration is greater than a predetermined threshold, displaying a direction of the predicted acceleration at a display portion in a vehicle cabin; and
    displaying an acceleration acting in a vehicle front-and-rear direction with priority in a case in which accelerations greater than the predetermined threshold are predicted to act on the vehicle in a plurality of directions.

14. A non-transitory storage medium storing a program executable by a computer to perform processing, the processing comprising:
    predicting a direction of an acceleration acting on a vehicle based on information including at least one of:
        information regarding a planned travel path of the vehicle,
        information acquired from a periphery information detection sensor configured to detect information regarding a vehicle periphery, or
        information acquired from an acceleration sensor configured to detect an acceleration of the vehicle;

in a case in which a predicted acceleration is greater than a predetermined threshold, displaying a direction of the predicted acceleration at a display portion in a vehicle cabin; and displaying an acceleration acting in a vehicle front-and-rear direction with priority in a case in which accelerations greater than the predetermined threshold are predicted to act on the vehicle in a plurality of directions.

\* \* \* \* \*